United States Patent [19]
Lang et al.

[11] Patent Number: 6,015,067
[45] Date of Patent: Jan. 18, 2000

[54] BOTTLE TOP DISPENSER

[75] Inventors: Andreas Lang, Marktheidenfeld; Hubert Kunze, Kreuzwertheim, both of Germany

[73] Assignee: Brand GmbH + Co., Germany

[21] Appl. No.: 09/010,659

[22] Filed: Jan. 22, 1998

[30] Foreign Application Priority Data

Jan. 27, 1997 [DE] Germany .............. 197 02 773

[51] Int. Cl.[7] ...................................... B67D 5/40
[52] U.S. Cl. .............. 222/153.13; 222/158; 222/340; 222/383.1
[58] Field of Search .................. 222/153.13, 158, 222/159, 383.1, 384, 386, 340; 422/100

[56] References Cited

U.S. PATENT DOCUMENTS 3,332,585  7/1967  Cox .
4,273,257  6/1981  Smith et al. .
4,306,670  12/1981  Oshikubo .

FOREIGN PATENT DOCUMENTS 3208436  9/1983  Germany .

Primary Examiner—Gregory L. Huson
Attorney, Agent, or Firm—Galgano & Burke

[57] ABSTRACT

The bottle top dispenser has a valve housing and a piston-cylinder unit, which can be releasably affixed to the housing, the piston and cylinder of which can be activated in an axial stroke movement relative to one another, in order to draw liquid from a bottle on which the dispenser is set, and eject it. The intake process takes place in a spring-activated extension movement, and the ejection process takes place in a manually activated compression movement of the piston-cylinder unit. The dispenser has an activation unit, where a releasable activation connection can be produced between the former and the piston-cylinder unit. The activation unit is provided with the spring element for the intake process, and preferably designed for the manual action for ejection.

23 Claims, 7 Drawing Sheets

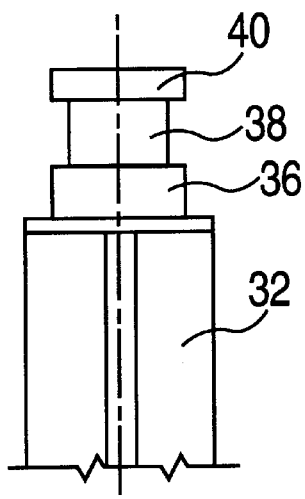
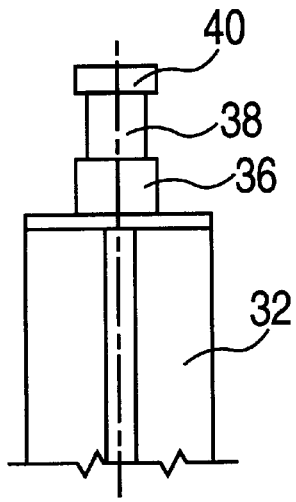
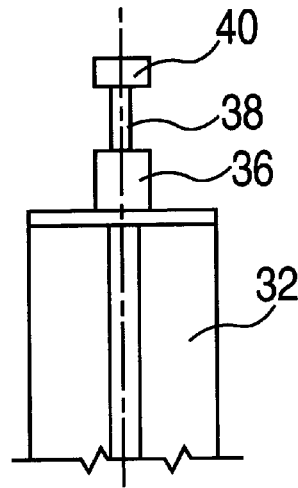
FIG. 12   FIG. 14   FIG. 16
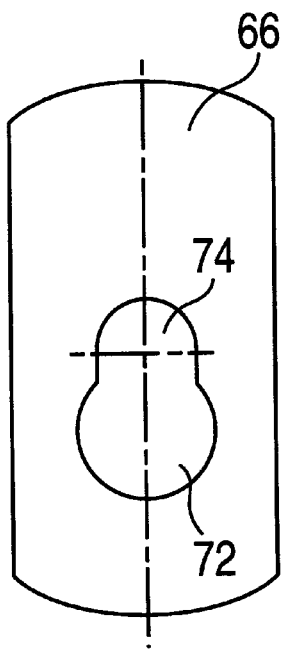
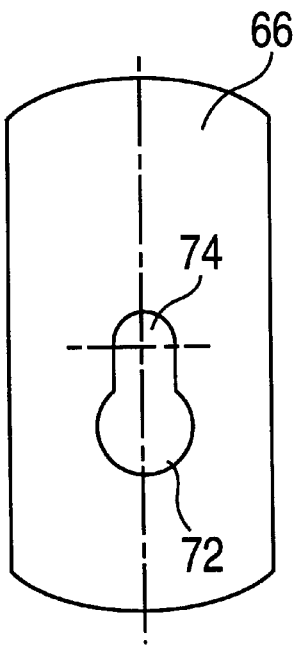
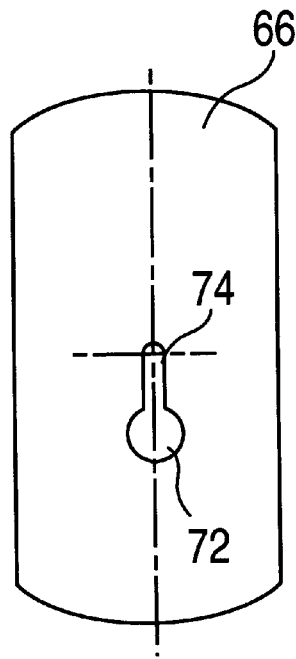
FIG. 13   FIG. 15   FIG. 17

BOTTLE TOP DISPENSER

BACKGROUND OF THE INVENTION

The invention relates to a bottle top dispenser with a valve housing and with a piston-cylinder unit, which can be releasably affixed to the housing, the piston and cylinder of which can be activated in an axial stroke movement relative to one another, in order to draw liquid from a bottle on which the dispenser is set, and eject it, where the intake process takes place in a spring-activated extension movement and the ejection process takes place in a manually activated compression movement of the piston-cylinder unit.

Such bottle top dispensers are known from practice. They are particularly used to repeatedly dispense an adjustable liquid volume from a bottle.

It is known that the piston-cylinder unit of a bottle top dispenser can be designed as an interchangeable part. Therefore it is provided that the piston-cylinder unit be affixed on the valve housing of the dispenser in releasable manner.

Piston-cylinder units designed as interchangeable parts can be cost-effectively produced by injection-molding of plastic. The requirements with regard to their durability are not as high as for dispensers with permanently installed piston-cylinder units.

Piston-cylinder units designed as interchangeable parts open up the possibility of equipping the valve housing of the dispenser with piston-cylinder units of different sizes, depending on the volume of liquid to be dispensed. Also, different types of liquid to be dispensed can have their own piston-cylinder units assigned to them, and they can be exchanged when the liquid is changed. This simplifies the work process, and high requirements with regard to purity are fulfilled with less effort.

The interchangeability of the piston-cylinder units is particularly important when working under sterile conditions and when handling radioactive substances. For hygiene reasons and for the sake of work place safety, it can be necessary to dispose of contaminated piston-cylinder units in the proper manner, rather than cleaning them.

The known bottle top dispensers are designed for one-hand operation. In the case of dispensers with a high intake force, a spring element, generally referred to as an intake spring, between the piston and the cylinder of the piston-cylinder unit serves for this purpose, to move the latter out in order to draw in liquid. To eject the liquid, the piston-cylinder unit is moved in by hand again, and during this process, the intake spring is tensed for the next intake stroke.

In piston-cylinder units designed as interchangeable parts, there is a problem with the intake spring.

On the one hand, dispensers are known in which the user must remove a helical pressure spring, which serves as the intake spring, from the old piston-cylinder unit, and clamp it in between the piston and the cylinder of the piston-cylinder unit, when the piston-cylinder unit is being replaced. This requires skill, time and effort. It is all too easy for the spring to jump away and become lost. There is also the risk of getting the piston-cylinder unit dirty.

On the other hand, dispensers in which each of the piston-cylinder units designed as interchangeable parts has its own intake spring are possible. But that would involve a lot of material and high costs, and there would be additional effort connected with disposal.

The problem with the intake spring is a serious one, and a major reason is that the spring must be quite strong. The spring is accordingly difficult to handle when replacing the piston-cylinder unit, and it is too good to be thrown away when replacement occurs.

SUMMARY OF THE INVENTION

It is the object of the invention to create a bottle top dispenser of the type stated initially, which has an intake spring element as a component, which does not cause any problems for the use when the piston-cylinder unit is replaced.

The bottle top dispenser which accomplishes this object has an activation unit for the extension and compression movement of the piston-cylinder unit, where a releasable activation connection can be produced between the former and the piston-cylinder unit. The activation unit is provided with the spring element for the intake process, and preferably designed for the manual action for ejection.

In a preferred embodiment, the activation unit can be releasably affixed to the valve housing of the dispenser. Replacement of a piston-cylinder unit can then take place as follows: First, the activation connection between the activation unit and the old piston-cylinder unit is released. The activation unit is taken off the valve housing, making the old piston-cylinder unit accessible. The old piston-cylinder unit is taken off the valve housing and the new piston-cylinder unit is affixed to it. Then a suitable activation unit is affixed to the valve housing, and finally, the activation connection between the activation unit and the new piston-cylinder unit is produced.

In a preferred embodiment, the activation unit has sleeves which surround one another coaxially, which are guided in telescope manner on one another, over the maximum stroke of the piston-cylinder unit. The spring element for intake is clamped between the sleeves. Preferably, a helical pressure spring is involved.

In a preferred embodiment, the activation unit fits over the piston-cylinder unit affixed on the valve housing, in a coaxial arrangement.

The releasable activation connection between the activation unit and the piston-cylinder unit can preferably be produced in the maximum compression position of the units. The latter is preferably a locked rest position of the dispenser. In this rest position, the dispenser has a low height, which is advantageous, for example, if a bottle with the dispenser on it is supposed to be placed in a refrigerator. Using the rest position for producing and releasing the activation connection takes advantage of the existing locking effect, and has the further advantage that the filling volume of the piston-cylinder unit is minimal.

In a preferred embodiment, the extension stroke of the activation unit can be limited by an adjustable stop, by means of which the output volume is adjusted. The stop can be continuously adjustable or adjustable in stages.

For affixing the piston-cylinder unit to the valve housing of the dispenser, and for coupling it with the activation unit, there are the variants that either the cylinder or the piston is the movable part of the piston-cylinder unit.

In the first variant, the piston of the piston-cylinder unit can be releasably affixed, in stationary position, on the valve housing of the dispenser, and a releasable activation connection can be produced between the activation unit and the cylinder of the piston-cylinder unit, for the extension and compression movement of the piston-cylinder unit. In this case, the liquid must be passed between the piston-cylinder unit and the valve housing via a movable line.

In the second variant, the cylinder of the piston-cylinder unit can be releasably affixed, in stationary position, on the valve housing of the dispenser, and a releasable activation connection can be produced between the activation unit and the piston of the piston-cylinder unit, for the extension and compression movement of the piston-cylinder unit.

The description of figures and the drawing refers only to the second variant. However, it is understood that the piston and cylinder are basically interchangeable and that all embodiments for the first variant apply analogously.

The releasable connection between the stationary part of the piston-cylinder unit and the valve housing is preferably a bayonet-type connection, e.g. a bayonet connection, a Luer lock or the like. This connection is axially secure and can be quickly and easily produced and released, while maintaining a seal.

In a preferred embodiment, one of the sleeves of the activation unit, preferably the inner sleeve, can be screwed onto the valve housing of the dispenser. Another sleeve of the activation unit, preferably the outer sleeve, has a slide which goes into releasable hold engagement with the movable part of the piston-cylinder unit.

Preferably, the movable part of the piston-cylinder unit has at least one projecting collar with a larger diameter and, axially behind it, a neck with a smaller diameter. The slide has an opening through which the collar fits in the release position, and which narrows in the activation direction, so that in the hold position, the neck fits in, but the collar does not fit through.

Preferably, the movable part of the piston-cylinder unit has collars on both sides of the neck.

Preferably, the slide locks into place in the hold position and the release position.

In accordance with the desired dispensing volume, the dispenser according to the invention can be equipped with piston-cylinder units of different sizes. In a preferred embodiment, an activation unit is assigned to each size, which preferably has a scale for the dispensing volume in each instance. Incorrect pairing of a piston-cylinder unit and an activation unit could result in an error, since the scale display does not agree with the actual dispensing volume. In such a preferred embodiment, it is therefore provided that such incorrect pairings are not functional. For this reason, necks and collars of piston-cylinder units of different sizes therefore differ in diameter, in pairs, and the openings in the slides of the related activation units are of different sizes, in such a way that an overly large collar will not fit into the opening and an overly small collar will fit through the constriction of the opening.

In a preferred embodiment, the sleeves of the activation unit are transparent or translucent. Therefore the user can see what is happening in the piston-cylinder unit, and check proper functioning of the dispenser.

Incorrect operation of the dispenser when a piston-cylinder unit is removed from the valve housing, which cannot be entirely precluded, comprises that the user does not first release the activation connection between the activation unit and the piston-cylinder unit, but rather attempts to remove the activation unit from the valve housing together with the piston-cylinder unit which is coupled to it. When this happens, liquid is drawn into the piston-cylinder unit. The user can see this through the transparent sleeves of the activation unit and can notice the error.

Another safety feature of the dispenser according to the invention is the use of a piston-cylinder unit in which the piston is seated in the cylinder with particular strength.

Syringes with a piston-cylinder unit for pipetting devices are conventionally made from plastic, by means of injection molding. It is known to form a circumferential bead into the wall of the cylinder liner during this process, against which the piston comes to rest in its maximum extension position. When the syringe is assembled, the piston is pressed over the bead from the outside. If sufficient force is applied, it is therefore also possible to pull the piston out of the cylinder over the bead, which can result in undesired splashing of liquid out of the bottle.

In case of such incorrect operation, the syringe is broken, for now, but the user can repair it by pressing the piston back into the cylinder over the bead.

To prevent incorrect operation and to improve operational reliability, piston-cylinder units in the form of a syringe made of plastic, in which the piston cannot be pulled out of the cylinder, are used for the dispenser according to the invention.

An attempt to pull the piston out of the cylinder of a syringe according to the invention should fail in that the syringe breaks at another, less critical point, preferably in such a way that it becomes irreparably non-functional, but does not leak.

In a preferred embodiment, a retainer ring for the piston is countersunk in the cylinder of the piston-cylinder unit. The retainer ring prevents the piston from being pulled completely out of the cylinder. Before the user is able to get the piston out of the cylinder over the retainer ring, the piston-cylinder unit preferably breaks at another, less critical point, for example in that the part at which the activation connection with the activation unit is produced breaks off.

The retainer ring can be switched between an active and inactive position. In the inactive state, it is supposed to permit installation of the piston in the cylinder and removal of the piston from the cylinder.

In a preferred embodiment, the piston has a piston head and a piston rod. The cylinder has a bottom with an intake and ejection opening, and a cylinder liner into which the piston head fits, forming a seal. The cylinder liner is open at its end facing away from the cylinder bottom, so that the piston can be installed in it. The retainer ring for the piston lies in front of the installation opening, and it is sized in such a way that the piston head does not fit through the retainer ring, but the piston rod does.

Preferably, the piston rod is guided in the retainer ring. This creates the possibility of filling or emptying a syringe without an activation unit coupled to it, without having to tilt the piston in the process.

The syringe is preferably sized in such a way that it is more likely that the piston rod will break or come off the piston head or that a connector piece of the syringe will tear out of its counterpart than that the piston head will overcome the retainer ring.

In a preferred embodiment, the retainer ring is circlipped onto the cylinder liner or circlipped into the cylinder liner. Also, the retainer ring can be glued or welded onto the cylinder liner, or formed from the cylinder liner by subsequent deformation.

In a preferred embodiment, the piston has a stroke reserve in the cylinder, in case of incorrect operation, which allows a release of the activation unit from the valve housing, while the activation connection between the activation unit and the piston-cylinder unit is produced in error, without the piston head reaching the retainer ring during this process. Incorrect operation can therefore not have the result that the piston head reaches the retainer ring with stepped-down force and overcome it after all. Rather, the piston head does not reach the retainer ring until the connection between the activation unit and the valve housing has been completely released. Therefore the user will notice the force increase directly, if the piston head reaches the retainer ring, and will intuitively stop his incorrect operation.

BRIEF DESCRIPTION OF THE DRAWINGS

The invention will be explained in greater detail below, on the basis of an exemplary embodiment shown in the drawings.

FIG. 12 shows a side view of the top end of the piston rod of a large piston-cylinder unit;

FIG. 13 shows a top view of the slide with which an activation unit is coupled to the large piston-cylinder unit;

FIG. 14 shows a side view of the top end of the piston rod of a medium-size piston-cylinder unit;

FIG. 15 shows a top view of the slide with which an activation unit is coupled to the medium-size piston-cylinder unit;

FIG. 16 shows a side view of the top end of the piston rod of a small piston-cylinder unit;

FIG. 17 shows a top view of the slide with which an activation unit is coupled to the small piston-cylinder unit.

DETAILED DESCRIPTION OF THE PREFERRED AND ILLUSTRATED EMBODIMENT

Figure 1:
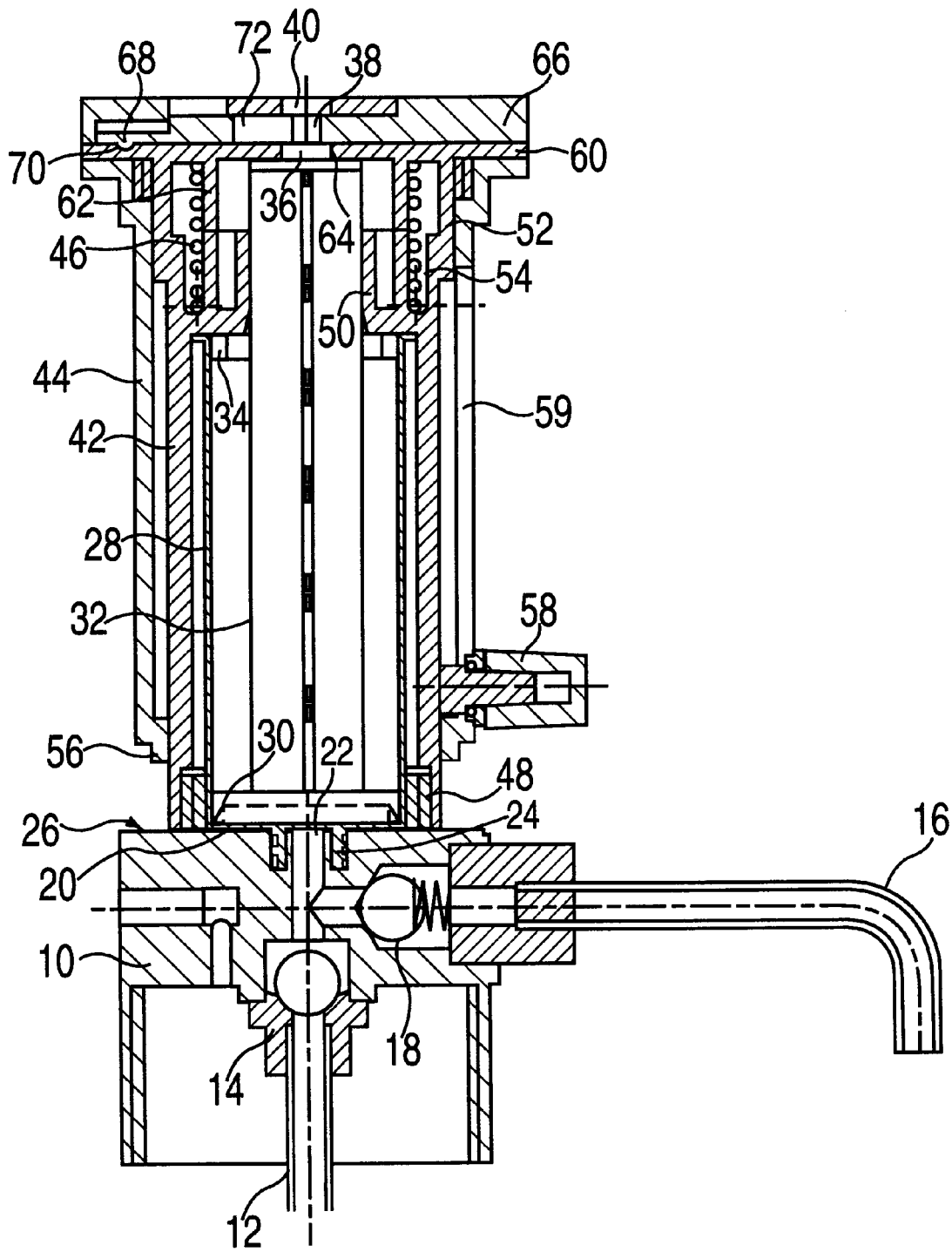
FIG. 1 shows a lateral axial cross-section of a bottle top dispenser, in which an activation unit with a slide is coupled to the piston of a piston-cylinder unit, in the entirely compressed position of the activation unit and the piston-cylinder unit, and with the slide in the locked position.

The bottle top dispenser has a valve housing 10 which can be set onto a bottle, the liquid content of which is dispensed by the dispenser.

From the valve housing 10, an intake line 12 goes down, with an intake valve 14 located ahead of it. The liquid is dispensed via a lateral cannula 16, in front of which there is an ejection valve 18. At the top, the valve housing 10 has a connector for a piston-cylinder unit designed as an interchangeable part, in the form of a plastic syringe.

The syringe has a cylinder bottom 20 with a central intake and ejection opening 22, which is surrounded by a cylindrical connector piece 24 which projects axially downward. The connector piece 24 forms a sealing Luer lock connection with a top opening of the valve housing 10.

The syringe has a circular cylindrical liner 28 for a piston, which consists of a piston head 30 and a piston rod 32. The piston head 30 is seated in the cylinder liner 28 so as to move axially, forming a seal. The piston rod 32 is attached to the piston head 30 centrally and axially, and projects out of the cylinder liner 28 at the top.

Instead of as just described, the cylinder bottom 20 can also be conical, and the piston head 30 can be correspondingly conical.

The end of the cylinder liner 28 which faces away from the cylinder bottom 20 is open for installation of the piston. After installation has taken place, a retainer ring 34 for the piston is inserted into the installation opening of the cylinder liner 28, and permanently connected with the latter. The retainer ring 34 is sized in such a way that the piston rod 32 fits through it.

Figure 10:
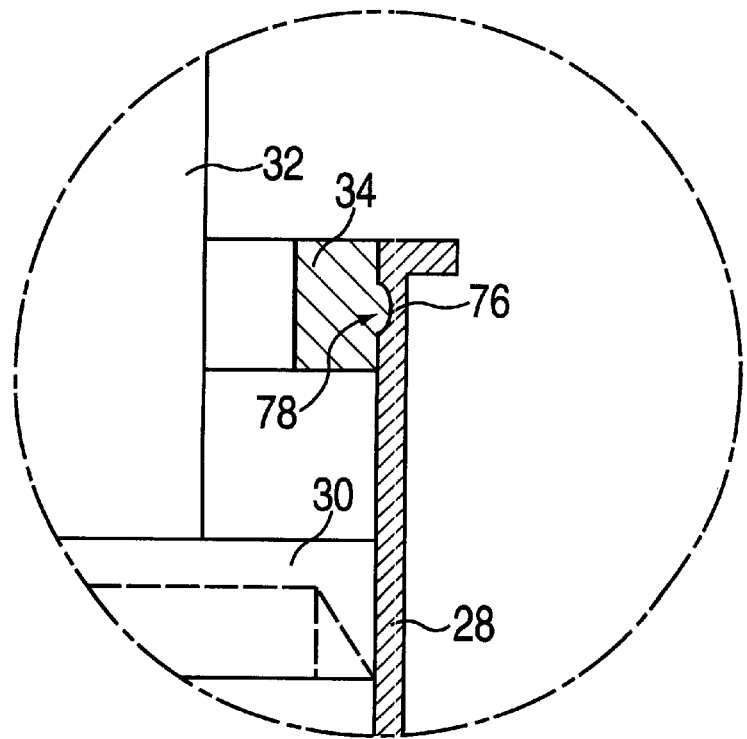
FIG. 10 shows a retainer ring circlipped into the cylinder of the piston-cylinder unit, as an enlarged detail of FIG. 8.

In accordance with FIG. 10, the retainer ring 34 is circlipped into the cylinder liner 28 of the piston-cylinder unit. The cylinder liner 28 has a circumferential annular groove 76 on its inside mantle, and the retainer ring 34 has a circumferential annular bead 78 on its outside mantle, which bead fits into the annular groove 76 with a positive lock. The annular groove 76 has an arc-shaped profile and the annular bead 78 has a corresponding crowned spherical curvature.

Figure 11:
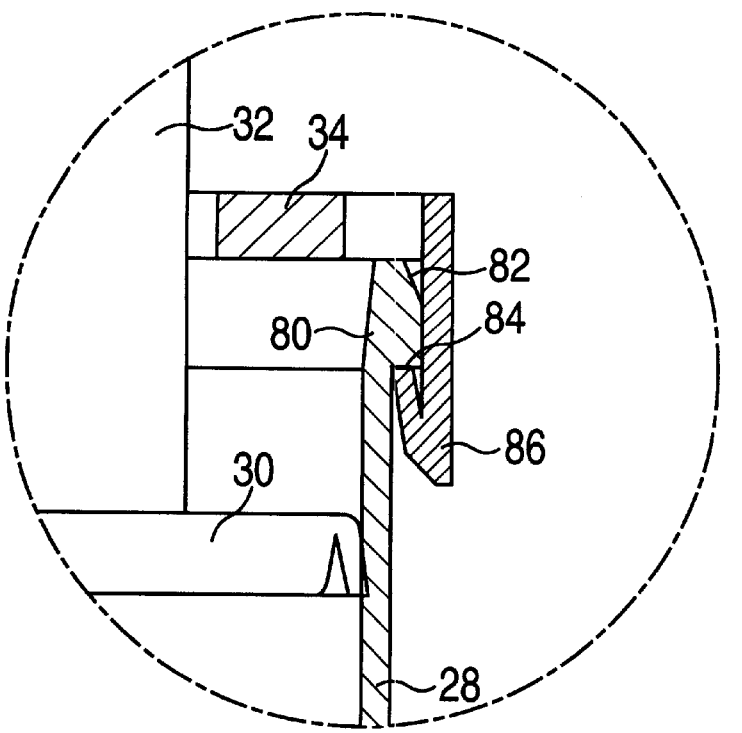
FIG. 11 shows likewise, a retainer ring circlipped onto the cylinder.

In accordance with FIG. 11, the retainer ring 34 is circlipped onto the cylinder liner 28 of the piston-cylinder unit. A hook 80 which is radially circumferential and projects outward axially and radially is formed onto the cylinder liner 28; it has a ramp 82 and an undercut 84 behind it on its end, on the outside. The retainer ring 34 has counterhooks 86 uniformly distributed over its circumference, at the edge, which can be pressed over the ramp 82 of the hook 80, spreading elastically, and fall into the undercut 84.

At the top end of the piston rod 32, there is a center, axial extension which serves to couple an activation unit to the piston rod 32. The extension is circular and cylindrical. It consists of a bottom collar 36 with a larger diameter which projects outward, a center neck 38 with a smaller diameter, and a top collar 40, again with a larger diameter, which projects outward.

The activation unit has a circular cylindrical inner sleeve 42 and a circular cylindrical outer sleeve 44 which coaxially surrounds it. Both sleeves 42, 44 are made of transparent plastic.

The sleeves 42, 44 are guided on one another in telescope manner. They are axially prestressed in the extension direction by means of a helical pressure spring 36 which serves as an intake spring. The maximum axial extension stroke of the sleeves 42, 44 is limited by a stop. It corresponds to the full metering stroke of the piston-cylinder unit.

The bottom end of inner sleeve 42 can be screwed onto a cylindrical threaded connector 48, which projects upward from the top 26 of the valve housing 10. The threaded connector 48 has an outside thread, and the inner sleeve 42 has a matching inside thread.

Directly above the cylinder of the piston-cylinder unit located in the Luer lock installation position, the top end of the inner sleeve 42 forms a radial shoulder with an inner guide ring 50 with a smaller diameter for the piston rod 32, and an outer guide ring 52 with a larger diameter for the telescope guidance of the outer sleeve 44. The outer guide ring 52 projects axially beyond the inner guide ring 50. The bottom end of the helical pressure spring 46 sits in a ring space 54 between the guide rings 50, 52.

The outer sleeve 44 fits over the inner sleeve 42 with radial play. At its bottom end, it narrows to a collar 56 which is guided on the outside mantle of the inner sleeve 42.

A rider 58 is affixed on the outer sleeve 44, which makes contact with the outer guide ring 52 of the inner sleeve 42. The rider 58 sits in an axial oblong hole 59 of the outside sleeve 44. It can be tightened in any desired position on the outer sleeve 44. The rider 58 allows infinite adjustment of the axial extension stroke of the outer sleeve 44 relative to the inner sleeve 42, i.e. infinite adjustment of the dispenser output volume.

In order to make the design simpler, the outer sleeve 44 can also have a step-by-step adjustment for the rider 58, which permits adjustment of the dispenser output volume only in discrete steps (not shown). This has the advantage that it is even more difficult to unintentionally move the rider out of its position when it is activated.

The contact of the rider 58 on the outer guide ring 52 of the inner sleeve 42 activated by the intake spring occurs rather abruptly. A pressure wave can form in the liquid that has been drawn in, which might briefly open the ejection valve 18 of the dispenser and permit a drop of fluid to exit. In order to prevent this, contact of the rider 58 is damped in a suitable manner. In particular, the rider 58 can be provided with a buffer made of elastic material (not shown).

The outer sleeve 44 of the activation unit is closed off at its upper end with a cover plate 60 recessed flush into it. The outer guide ring 52 of the inner sleeve 42 touches the cover plate 60 in order to limit the compression stroke of the piston-cylinder unit.

From the bottom of the cover plate 60, a cylindrical bushing 62 projects in a coaxial arrangement; the top end of the helical screw spring 46 lies around this bushing. The cover plate 60 has a center, circular opening 64, through which the extension at the top end of the piston rod 32 of the piston-cylinder unit which is in the Luer lock position fits.

At the top of the cover plate 60, a slide 66 is guided so as to be radially adjustable. The slide 66 interacts with the extension at the top end of the piston rod 32 of the piston-cylinder unit which is in the Luer lock position, in order optionally to couple the outer sleeve 44 of the activation unit to the piston rod 32—hold position of the slide 66—or to release it from the rod—release position of the slide 66.

The slide 66 has a nub 68, which engages in a depression 70 of the cover plate 60 both in the hold position and in the release position of the slide 66.

The slide 66 has an opening 72 which is circular, in part, which is aligned with the center opening 64 of the cover plate 60 in the release position, and releases its clearance. The slide 66 fits over the projecting collars 36, 40 on the extension of the piston rod 32 in the release position, with its circular opening segment 72.

The opening of the slide 66 narrows in the activation direction to form an oblong hole 74, into which the neck 38 on the extension of the piston rod 32 fit, but the projecting collars 36, 40 do not fit through. The slide 66 seizes the neck 38 between the collars 36, 40 in the hold position, and produces an axially rigid connection between the piston rod 32 of the piston-cylinder unit and the outer sleeve 44 of the activation unit.

The dispenser has a rest position which is the maximum compression position of the piston in the cylinder of the piston-cylinder unit, and, at the same time, the maximum compression position of the outer sleeve 44 relative to the inner sleeve 42 of the activation unit. In this rest position, the inner sleeve 42 and the outer sleeve 44 are axially locked into one another (not shown). The lock can be formed, for example, with the rider 58 in the dispensing volume position zero. The helical pressure spring 46 is under maximum tension in the locked rest position.

To replace a piston-cylinder unit, the slide 66 of the activation unit is brought into the release position while it is in its rest position, as mentioned, and the activation unit is unscrewed from the valve housing 10 of the dispenser. Then the Luer lock connection of the old piston-cylinder unit is released, the Luer lock connection of a new piston-cylinder unit is produced, a matching activation unit is screwed onto the valve housing 10, and the slide 66 is brought into the hold position, in order to couple the piston rod 32 of the new piston-cylinder unit to the outside sleeve 44 of the activation unit.

If the user incorrectly starts to unscrew the activation unit from the valve housing 10 while a piston-cylinder unit is coupled to the activation unit, liquid is drawn into the piston-cylinder unit. The user can see this through the transparent sleeves 42, 44, and notices his error.

Figure 2:
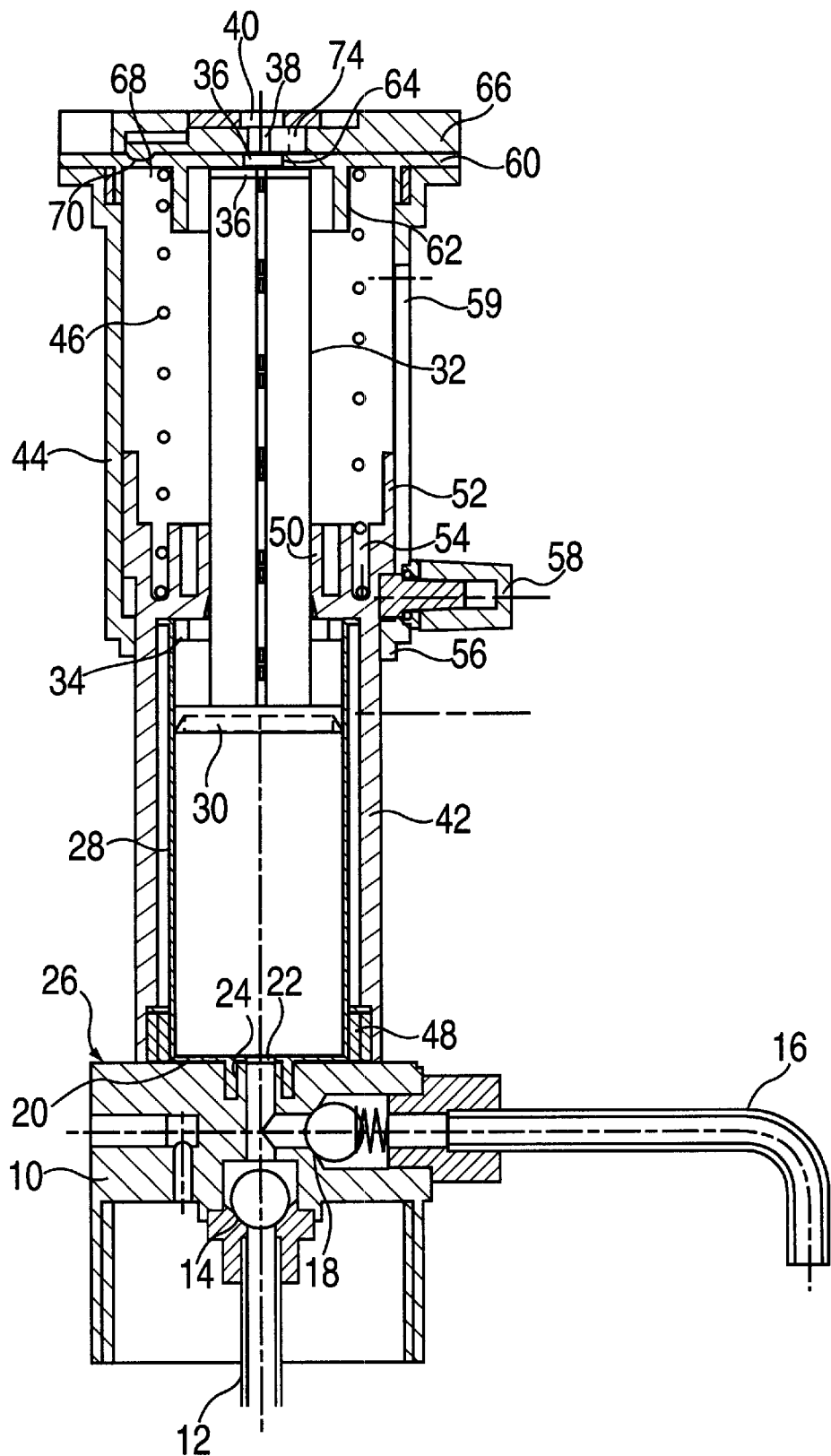
FIG. 2 shows a lateral axial cross-section of the bottle top dispenser in the entirely extended position of the activation unit and the piston-cylinder unit, and with the slide in the release position; it should be noted that the slide does not assume this release position in operation.
Figure 3:
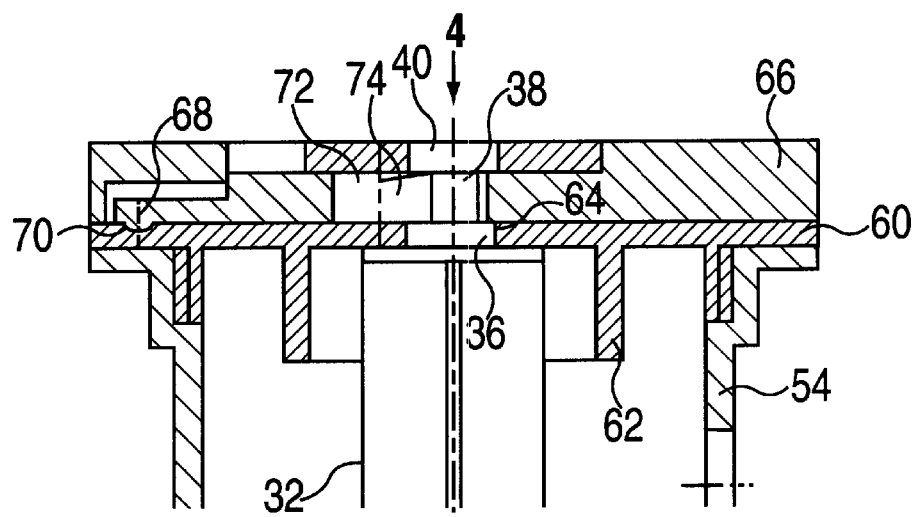
FIG. 3 shows the top end of the activation unit and the piston-cylinder unit as an enlarged detail of FIG. 1.
Figure 4:
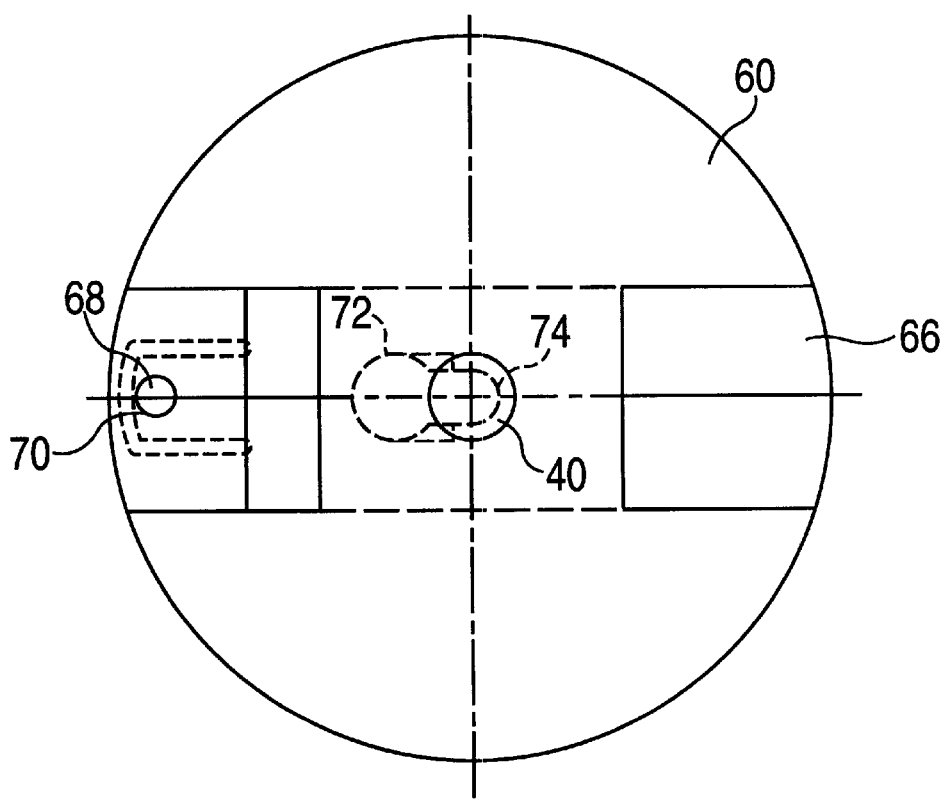
FIG. 4 shows an axial top view of the activation unit and the piston-cylinder unit as an enlarged detail of FIG. 3.
Figure 5:
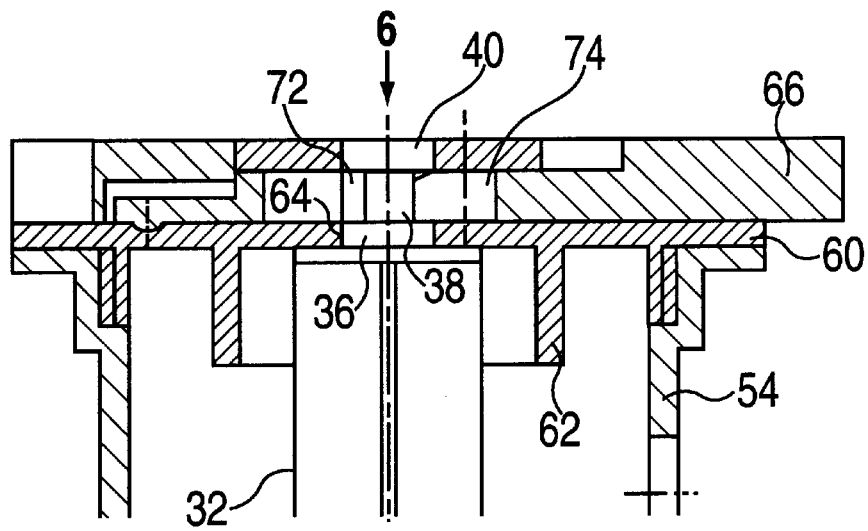
FIG. 5 shows the top end of the activation unit and the piston-cylinder unit as an enlarged detail of FIG. 2.
Figure 6:
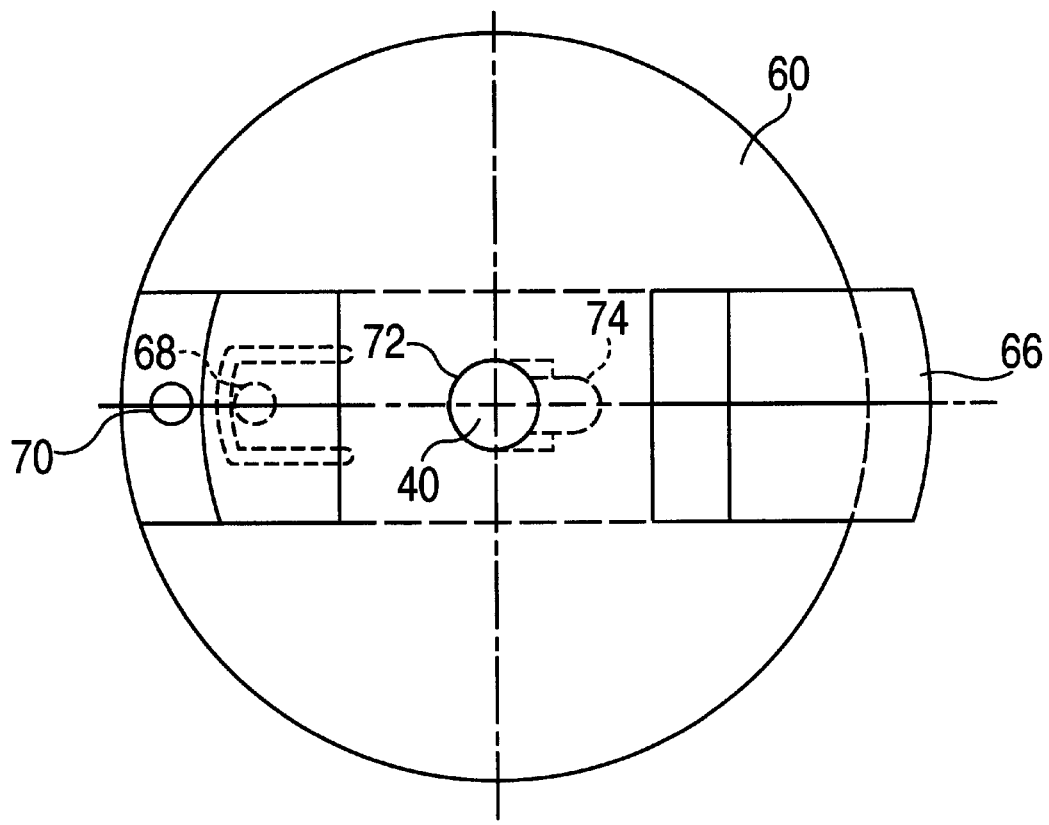
FIG. 6 shows an axial top view of the activation unit and the piston-cylinder unit with the view in the direction VI of FIG. 5.
Figures 7, 8, 9:
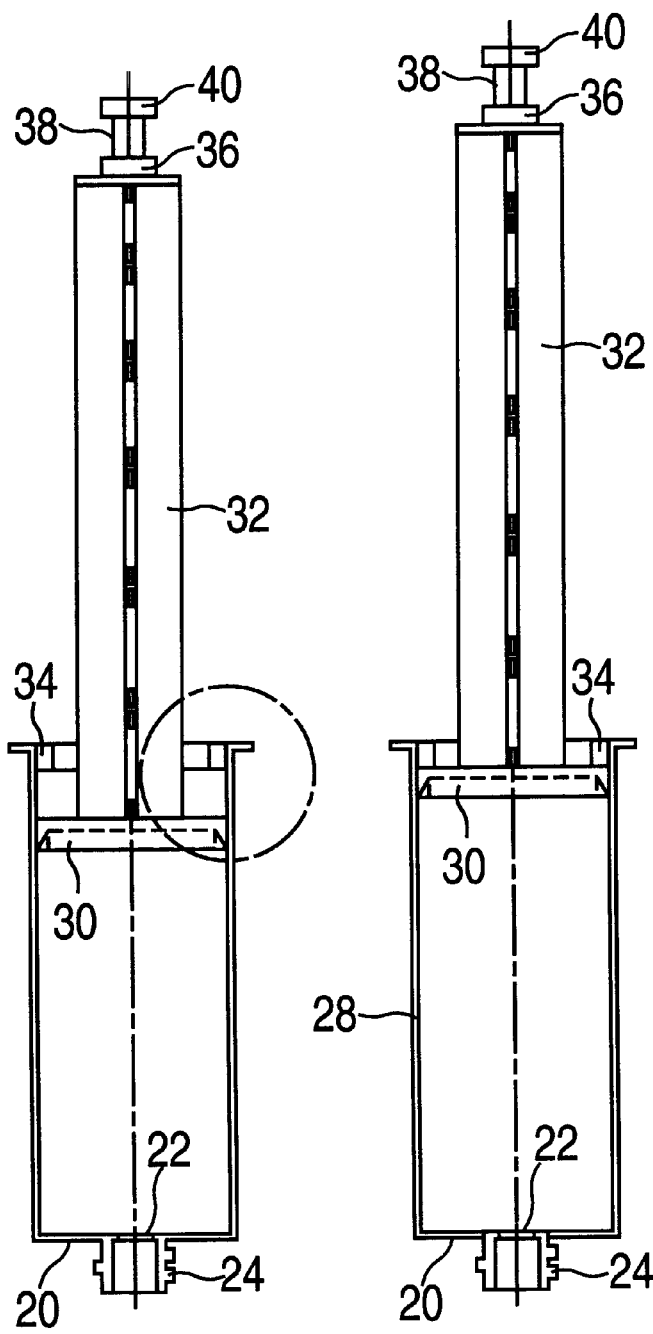
FIG. 7 shows a side view of the piston-cylinder unit with the piston entirely compressed.
FIG. 8 shows a side view of the piston-cylinder unit with the full metering stroke, corresponding to the piston being entirely extended.
FIG. 9 shows a side view of the piston-cylinder unit with the piston in the secured stop position.

As shown in FIG. 2 and FIG. 8, the piston has a stroke reserve in the cylinder, in case of incorrect operation. The piston head 30 assumes a securing contact position on the retainer ring 34 beyond the full metering stroke.

As shown in FIG. 12 to FIG. 17, an activation unit is assigned to each of piston-cylinder units of different sizes. The piston-cylinder units are labeled with regard to size. The activation unit are provided with a scale for the dispensing volume in each instance. By means of structuring the extensions on the piston rod 32 and the slide openings of the activation units, it is possible to ensure that only the right activation unit can be coupled to the piston-cylinder unit in each instance, over and above clear labeling.

In the case of the large piston-cylinder unit according to FIG. 12, the collars 36, 40 and the neck 38 on the extension of the piston rod 32 are large in diameter, and the opening in the slide 66 of the corresponding activation unit is correspondingly large (see FIG. 13).

In the case of the medium-size piston-cylinder unit according to FIG. 14, the collars 36, 40 and the neck 38 on the extension of the piston rod 32 are medium-size in diameter, and the opening in the slide 66 of the corresponding activation unit is correspondingly medium-size (see FIG. 15).

In the case of the small piston-cylinder unit according to FIG. 16, the collars 36, 40 and the neck 38 on the extension of the piston rod 32 are small in diameter, and the opening in the slide 66 of the corresponding activation unit is correspondingly small (see FIG. 17).

The collar 36, 40 on the extension of the piston rod 32 of a larger piston-cylinder unit does not fit into the opening of the slide 66 of an activation unit which is assigned to a smaller piston-cylinder unit. A larger piston-cylinder unit can therefore not be incorrectly coupled to an activation unit for a smaller piston-cylinder unit.

A collar 36, 40 on the extension of the piston rod 32 of a smaller piston-cylinder unit fits through the constriction 74 of the slide opening of an activation unit which is assigned to a larger piston-cylinder unit. A smaller piston-cylinder unit can therefore not be incorrectly coupled to an activation unit for a larger piston-cylinder unit.

What is claimed is:

1. A bottle top comprising:

a valve housing which can be set onto a bottle a piston-cylinder unit removably and interchangeable affixed to said valve housing, said piston-cylinder unit comprising a piston and cylinder, one part of which is stationary and the other part of which is movable relative to the one part in an axially-directed reciprocable stroke, for movement between a draw-out axial end position, in which said unit serves to draw liquid in from the bottle, and a manually-activated push-in axial end position, in which liquid drawn in from a bottle is ejected; and a dispenser for dispensing the liquid contents of the bottle, said dispenser including an activation unit having means for activating said piston-cylinder unit to effect movement thereof between said draw-out and push-in positions, said activation unit being releasably affixed to said valve housing, and said means for activating including spring means for moving said piston-cylinder unit into said draw-out position and manually-operated means for moving said piston-cylinder unit into said push-in position.

2. The dispenser according to claim 1, wherein said means for activating includes a plurality of co-axially and telescopically arranged sleeves which are guided in a telescopic manner over one another, and over said axial stroke of said piston-cylinder unit, and wherein said spring means is clamped between said sleeves.

3. The dispenser according to claim 2, wherein said means for activating comprises an inner sleeve and an outer sleeve, and said spring means comprises a helical pressure spring clamped between them.

4. The dispenser according to claim 1, wherein said activation unit fits over said piston-cylinder unit affixed on the valve housing in a coaxial arrangement.

5. The dispenser according to claim 4, wherein said activation unit is releasable from said valve housing when said activation means and said piston-cylinder unit are in said push-in position, which defines a locked rest position of the dispenser.

6. The dispenser according to claim 5, additionally including an adjustable stop for limiting the movement of said means for activating.

7. The dispenser according to claim 1, wherein said piston of said piston-cylinder unit is releasably affixed, in a stationary position, on said valve housing of said dispenser, and wherein activation unit is releasably coupled to said cylinder of the piston-cylinder unit for effecting the stroke movement of said piston-cylinder unit.

8. The dispenser according to claim 1, wherein said cylinder of the piston-cylinder unit is releasably affixed, in a stationary position, on said valve housing of the dispenser, and wherein said activation unit for activating is releasably coupled to said piston of said piston-cylinder unit for effecting the stroke movement of said piston-cylinder unit.

9. The dispenser according to claim 8, additionally including a bayonet-type connection between the stationary part of said piston-cylinder unit and said valve housing.

10. The dispenser according to claim 2, wherein one of said sleeves is screwed onto the valve housing, and another of said sleeves has a slide which releasably engages the movable part of said piston-cylinder unit.

11. The dispenser according to claim 10 wherein said movable part of said piston-cylinder unit has at least one projecting collar with a larger diameter and, axially between it, a neck with a smaller diameter, and wherein said slide has an opening through which the collar fits in the release position, and which narrows in the activation direction, so that in the hold position, the neck fits in, but the collar does not fit through.

12. The dispenser according to claim 11, wherein said movable part of said piston-cylinder unit has collars on both sides of the neck.

13. Dispenser according to claim 11, wherein said slide locks into place in the hold position and the release position.

14. The dispenser according to claim 11, wherein piston-cylinder units of different sizes each have an activation unit assigned to them, and the activation unit is provided with a scale for the dispensing volume in each instance, and that the collars and necks of piston-cylinder units of different sizes differ in diameter, in pairs, and the openings in the slides of the related activation units are of different sizes, such that an overly large collar will not fit into the opening and an overly small collar will fit through the constriction of the opening.

15. The dispenser according to claim 1, wherein said sleeves are at least translucent.

16. The dispenser according to claim 1, wherein said piston-cylinder unit is in the form of a syringe made of plastic, in which the piston cannot be pulled out of the cylinder.

17. The dispenser according to claim 1, wherein a retainer ring for the piston is countersunk in the cylinder.

18. The dispenser according to claim 1, wherein said retainer ring can be switched between an active and inactive position.

19. The dispenser according to claim 1, wherein said retainer ring is releasably clipped to said cylinder liner.

20. The dispenser according to claim 1, wherein said retainer ring is permanently affixed to said cylinder liner.

21. The dispenser according to claim 1, wherein said piston has a piston head and a piston rod, said cylinder has a bottom with an intake and ejection opening, and a cylinder liner into which said piston head fits, forming a seal, said cylinder liner having an installation opening for the piston at its end facing away from the cylinder bottom, and wherein said retainer ring lies in front of the installation opening, and said piston rod fits through a retainer ring and is guided in it.

22. The dispenser according to claim 21, wherein said dispenser is designed and configured such that the piston rod will break off from the piston head or that a connector piece of the syringe will tear out of its counterpart before the piston head will slip past the retainer ring.

23. The dispenser according to claim 1, wherein said piston has a stroke reserve in the cylinder, in case of incorrect operation, which allows release of said for activation unit from said valve housing, while the activation connection between the activation unit and the piston-cylinder unit is produced in error, without the piston head reaching the retainer ring during this process.

* * * * *